United States Patent
Li et al.

(10) Patent No.: US 10,723,843 B2
(45) Date of Patent: Jul. 28, 2020

(54) PROCESS FOR PREPARING PLATINUM ORGANOSILOXANE COMPLEXES USING AN ENONE ADDITIVE

(71) Applicant: Dow Silicones Corporation, Midland, MI (US)

(72) Inventors: Zhanjie Li, Midland, MI (US); Andrew Millward, Midland, MI (US); Ming-Shin Tzou, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/348,173

(22) PCT Filed: Jul. 18, 2018

(86) PCT No.: PCT/US2018/042583
§ 371 (c)(1),
(2) Date: May 8, 2019

(87) PCT Pub. No.: WO2019/018461
PCT Pub. Date: Jan. 24, 2019

(65) Prior Publication Data
US 2020/0148833 A1 May 14, 2020

Related U.S. Application Data

(60) Provisional application No. 62/534,952, filed on Jul. 20, 2017.

(51) Int. Cl.
*C08G 77/08* (2006.01)
*C08G 77/398* (2006.01)
*B01J 31/12* (2006.01)

(52) U.S. Cl.
CPC .......... *C08G 77/398* (2013.01); *B01J 31/124* (2013.01); *B01J 2231/323* (2013.01); *B01J 2531/828* (2013.01); *C08G 77/08* (2013.01)

(58) Field of Classification Search
CPC .... C08G 77/08; B01J 2231/323; B01J 31/124
See application file for complete search history.

(56) References Cited

U.S. PATENT DOCUMENTS

| 2,676,182 A | 4/1954 | Daudt et al. | |
| 5,175,325 A * | 12/1992 | Brown | B01J 31/124 556/136 |
| 5,312,937 A * | 5/1994 | Waier | B01J 31/1675 528/15 |
| 5,424,470 A * | 6/1995 | Bank | C07F 7/0829 556/479 |
| 2009/0171058 A1 | 7/2009 | Kilgour | |

FOREIGN PATENT DOCUMENTS

GB  2252771  2/1992

OTHER PUBLICATIONS

Lewis, "Platinum Catalysts Used in the Silicones Industry," Platinum Metals Rev., 1997, p. 66-75, 41. (2).
Izakovic, "The reaction of cloroplatinic acid with acetone in the presence of quinone." Organometallic Chemistry in the USSR, 1988, p. 233-235, vol. 1.
Gulinski, "Catalysis of Hydrosilylation: Part XXIV. H2PtCl6 in Cyclohexanone as Hydrosilylation Catalysts—What is the Active Species in this Catalytic System?" Applied Organometallic Chemistry, 1994, p. 409-414, vol. 8.
Georg, "Structure and Bonding of the Hexameric Platinum(II) Dichloride, Pt6Cl12 (B-PtCl2)", 2003, p. 516-522.
Gorlov, "Pt6Cl12(1,2,4-C6H3Cl3), a Structurally Characterized Cocrystallization Product of Pt6Cl12", Z. Anorg Allg. Chem, 2005, 2973-2975.
Cini, "Synthesis and Crystal Structure of the First Trinuclear Chloride-bridged Platinum(II) Complex with Mutually Perpendicular Co-ordination Planes: cyclo-Tri-u-chloro-tris[chloro(1-hydroxy-1-imino-2,2-dimethylpropane) platinum(II)]-Dichloromethane (0.5/1)", J. Chem. Soc. Dalton Trans., 1994, p. 3753-3758.
Chandra, "A Convenient and Novel Route to Bis(n-alkyne)platinum(0) and Other Platinum(0) Complexes from Speler's Hydrosilylation Catalyst H2[PtCl6]xH20. X-ray Structure of [Pt{(n-Ch2=CHSIMe2)2O}(P-t-Bu3)]", Organometallics, vol. 6, No. 1, 1987.
Fleury, "Cooperative Titanocene and Phosphine Catalysis: Accelerated C-X Activation for the Generation of Reactive Organometallics", The Journal of Organic Chemistry, 2013, p. 253-269.
Ramos, "Functionalisation of terpenoids at C-4 via organopalladium dimers: cyclopropane formation during oxidation of homoallylic o-organopalladium intermediates with lead tetraacetate", Tetrahedron 63 (2007) 12608-12615.

* cited by examiner

*Primary Examiner* — Margaret G Moore

(57) ABSTRACT

A platinum organosiloxane complex is prepared by a process including combining A) a platinous halide; B) a ketone; C) an enone additive distinct from any other starting materials or rearrangement products thereof; and D) a polyorganosiloxane having, per molecule, 2 to 4 silicon bonded terminally unsaturated hydrocarbon groups having from 2 to 6 carbon. The platinum organosiloxane complex prepared by the process is useful as a hydrosilylation catalyst.

14 Claims, No Drawings

PROCESS FOR PREPARING PLATINUM ORGANOSILOXANE COMPLEXES USING AN ENONE ADDITIVE

CROSS-REFERENCE TO RELATED APPLICATIONS

This application is a U.S. national stage filing under 35 U.S.C. § 371 of PCT Application No. PCT/US2018/042583 filed on 18 Jul. 2018, currently pending, which claims the benefit of U.S. Provisional Patent Application No. 62/534952 filed 20 Jul. 2017 under 35 U.S.C. § 119 (e). PCT Application No. PCT/US2018/042583 and U.S. Provisional Patent Application No. 62/534952 are hereby incorporated by reference.

TECHNICAL FIELD

A process forms a platinum organosiloxane complex, which is useful as a hydrosilylation reaction catalyst. More particularly, the process is robust and produces a platinum organosiloxane complex with lowered reaction processing time to achieve good yield regardless of the quality of starting materials as compared to previous methods.

BACKGROUND

One method for preparing a platinum organosiloxane complex includes concurrently combining a platinous halide, a polar organic liquid and an organosiloxane having silicon bonded organic groups with terminal olefinic unsaturation under conditions to react the platinous halide with the organosiloxane. This method may lack robustness in that various factors, such as crystallite size and/or quality of the platinous halide can lower the yield of platinum organosiloxane complex.

SUMMARY

A process can be used to form a product comprising a platinum organosiloxane complex. The process comprises:
1) combining starting materials comprising
   A) a platinous halide;
   B) a ketone;
   C) an enone additive distinct from any other starting materials or rearrangement products thereof where the enone additive is a compound of formula (I) and/or formula (II), where formula (I) is

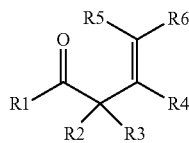

and formula (II) is

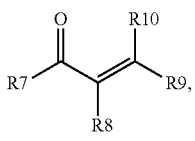

where R1 to R10 are each independently selected from hydrogen, an alkyl group having from 1 to 6 carbon atoms, and a phenyl group, or any two of R1 to R10 may combine to form one or more carbocyclic groups; with the proviso that when R1 is methyl and one of R2 and R3 is hydrogen and the other of R2 and R3 is methyl, and R5 and R6 are both hydrogen; then R4 is not methyl; and D) a polyorganosiloxane having, per molecule, 2 to 4 silicon bonded terminally unsaturated hydrocarbon groups having from 2 to 6 carbon atoms and any remaining silicon bonded organic groups being monovalent hydrocarbon groups of 1 to 12 carbon atoms.

DETAILED DESCRIPTION

Process Steps

The process described herein forms a product comprising a platinum organosiloxane complex, which is useful as a hydrosilylation reaction catalyst. The process comprises:
1) combining starting materials comprising
   A) a platinous halide;
   B) a ketone;
   C) an enone additive distinct from any other starting materials or rearrangement products thereof where the enone additive is a compound of formula (I) and/or formula (II), where formula (I)

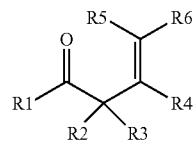

is and formula (II) is

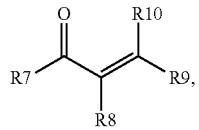

where R1 to R10 are each independently selected from hydrogen, an alkyl group having from 1 to 6 carbon atoms, or a phenyl group, or where any two of R1 to R10 may combine to form one or more cyclic groups; with the proviso that when R1 is methyl and one of R2 and R3 is hydrogen and the other of R2 and R3 is methyl, and R5 and R6 are both hydrogen; then R4 is not methyl; and D) a polyorganosiloxane having, per molecule, 2 to 4 silicon bonded terminally unsaturated hydrocarbon groups having from 2 to 6 carbon atoms and any remaining silicon bonded organic groups being monovalent hydrocarbon groups of 1 to 12 carbon atoms; thereby forming a reaction mixture. The process may further comprise: 2) neutralizing the reaction mixture formed in step 1); thereby forming a neutralized reaction product, and 3) recovering the platinum organosiloxane complex from the reaction mixture of step 1) and/or the neutralized reaction product of step 2). The process may further comprise step 4) adding E) an additional polyorganosiloxane to the reaction mixture and/or the neutralized reaction product during and/or after step 2).

Step 1)

Step 1) of the process described above may be performed at ambient or elevated temperature. For example, the starting materials may be combined at room temperature of 25° C. Alternatively, the starting materials may be combined with heating, up to a temperature that does not degrade the platinous halide selected as starting material A) and/or that does not remove too much of the ketone selected as starting material B) and/or that does not remove too much of the enone additive selected as starting material C) and that does not degrade the platinum organosiloxane complex. In step 1), the starting materials may be combined by mixing at 25° C. to 90° C. Step 1) may be performed by heating the starting materials for at least 8 hours at a temperature of 30° C. or less, e.g., 25° C. to 30° C. Alternatively, step 1) may be performed by heating the starting materials for 1 to 8 hours at a temperature of 55° C. to 90° C., alternatively 2 to 5 hours at a temperature of 85° C.

Starting materials A), B), C) and D) may be combined in any order. Alternatively, starting materials B), C) and D) may be combined to form a mixture, and thereafter the mixture and starting material A) may be combined in step 1).

The process may further comprise milling A) the platinous halide in the presence of B) the ketone before and/or during step 1). Alternatively, step 1) may be performed by milling A) the platinous halide in the presence of C) the enone additive before adding B) the ketone. Alternatively, the process may further comprising milling A) the platinous halide in the presence of B) the ketone and C) the enone additive before and/or during step 1). Milling may be performed by any convenient means, such as adding inert particles, such as glass beads, to a container containing the starting materials in step 1) and subjecting the container to rolling or agitation. Milling may be performed at ambient or elevated temperatures, such as the temperatures described above for step 1).

Step 2)

Step 1) of the process produces a reaction mixture. Step 2) of the process described herein comprises neutralizing the reaction mixture formed in step 1). Neutralizing the mixture may be accomplished by mixing the reaction product with a hydrocarbon solvent, such as heptane, toluene, or xylene and a basic buffer solution at elevated temperature. The exact temperature selected for step 2) depends on various factors including the volatility of the ketone selected for starting material B), however, step 2) may be performed at 40° C. to 50° C.

The buffer solution comprises deionized water and a salt such as sodium bicarbonate, calcium carbonate, magnesium oxide, or magnesium carbonate. Alternatively, the buffer solution comprises sodium bicarbonate.

Step 3)

The platinum organosiloxane complex may be recovered from the neutralized reaction product formed in step 2) by any convenient means, such as filtering, stripping and/or distillation. Pressure may be reduced to facilitate removal one or more starting materials and/or by-products.

Optional, Additional Process Steps

It is not necessary to dry the starting materials before their use in this process, however, drying one or more of the starting materials may be performed as an additional step before step 1). In one embodiment, step 1) is performed in the absence of added water. After step 1), the reaction mixture may be stripped and/or distilled to remove excess water, ketone, enone additive, and/or excess polyorganosiloxane. Pressure may be reduced to facilitate removal one or more starting materials and/or by-products. Alternatively, the reaction mixture may be filtered after step 1) and before step 2) to remove unreacted solids and/or solid by-products, and/or inert particles used for milling, if any.

The following starting materials are used in the process described herein.

A) Platinous Halide

Starting material A) used in the process described above is a platinous halide. The platinous halide has general formula $Pt_aX_b$, where subscript a is 1 to 6 and subscript b is 2 to 12. Each X is independently a halogen atom, such as Br, Cl, F or I; alternatively Br, Cl or F; alternatively Br or Cl; and alternatively Cl. The particle size and/or crystallite size of starting material A) is not critical. Starting material A) may include an impurity, for example, starting material A) may contain up to 10% of zero valent platinum ($Pt^0$). Alternatively, starting material A) may contain up to 5%, alternatively up to 0.6%, and alternatively up to 0.3% of zero valent platinum ($Pt^0$). Alternatively, starting material A) may contain 0.3% to 1%, and alternatively 0.3% to 0.6% of zero valent platinum ($Pt^0$). Examples of suitable platinous halides for starting material A) include platinum dichloride of formula $Pt_6Cl_{12}$. Platinous halides, such as platinum dichloride are commercially available from Heraeus, Johnson Matthey, or Sigma Aldrich.

B) Ketone

Starting material B) is a ketone. The ketone may have 4 to 8 carbon atoms. Starting material B) may be acetone and/or methyl ethyl ketone. Alternatively, starting material B) may be methyl ethyl ketone. Starting material B) may be used in an amount of 1 to 20 moles of ketone per mole of platinous halide.

C) Enone Additive

Starting material C) is an enone additive included in the process in step 1). The enone additive is in addition to the other starting materials, and in addition to any enone compound that may form by rearrangement/reaction of the ketone selected for starting material B). The enone additive for starting material C) may be distinct from any compound formed by rearrangement/reaction of the ketone and/or the enone additive may be an additional amount of a compound that is the same as a rearrangement/reaction product of the ketone selected for starting material B). The enone additive is a compound of formula (I) and/or formula (II), where formula (I) is

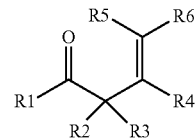

and formula (II) is

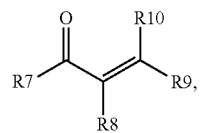

where R1 to R10 are each independently selected from hydrogen, an alkyl group having from 1 to 6 carbon atoms, and a phenyl group, or any two of R1 to R10 may combine to form one or more cyclic groups; with the proviso that when R1 is methyl and one of R2 and R3 is hydrogen and the other of R2 and R3 is methyl, and R5 and R6 are both hydrogen; then R4 is not methyl. Alternatively, each of R1 to R10 is independently selected from H and a methyl group. Alternatively, one of R5 and R6 is hydrogen and the other of R5 and R6 is an alkyl group, such as methyl. The enone additive may have 4 to 20 carbon atoms. Alternatively, R1 and R2 may combine to form a carbocyclic group. Alternatively, R4 and R6 may combine to form a carbocyclic group. Alternatively, both R1 and R2, and R4 and R6, may combine to form carbocyclic groups. Examples of suitable enone additives include (C1) (4E)-3-4-Dimethyl-4-hexen-2-one; (C2) (5E)-5-Methyl-5-hepten-3-one; (C3) 4-Penten-2-one; (C4) 3-Methyl-4-penten-2-one; (C5) 4-Methyl-4-penten-2-one; (C6) 3,3-Dimethyl-4-penten-2-one; (C7) 3,3,4-Trimethyl-4-penten-2-one; (C8) (4Z)-3,4-Dimethyl-4-hexen-2-one; (C9) 2-(1-cyclohexenyl)cyclohexanone (commercially available from Alfa Aesar); (C10) 3-Buten-2-one (commercially available from Aldrich); (C11) (3E)-3-Penten-2-one (commercially available from Aldrich); (C12) (3E)-3-Methyl-3-penten-2-one (commercially available from Aldrich); (C13) 4-Methyl-3-penten-2-one (commercially available from Aldrich); and two or more of (C1), (C2), (C3), (C4), (C5), (C6), (C7), (C8), (C9), (C10), (C11), (C12), and (C13). When methyl ethyl ketone is used as starting material B), then the enone additive may be selected from the group consisting of (C3), (C4), (C5), (C6), (C7), (C8), (C9), (C10), (C11), (C12), (C13), and two or more of C3), (C4), (C5), (C6), (C7), (C8), (C9), (C10), (C11), (C12), and (C13). Suitable enone additives of formula (I) include (C1), (C2), (C3), (C4), (C5), (C6), (C7), (C8), and (C9). Suitable enone additives of formula (II) include (C10), (C11), (C12), and (C13). Starting material C) may be used in an amount 0.1% to 50%, alternatively 1% to 10%, and alternatively 1% to 5%, based on combined weights of liquid starting materials used in step 1) (e.g., starting materials B), C), D) and when present, E), described below).

D) Polyorganosiloxane

Starting material D) is a polyorganosiloxane having, per molecule, 2 to 4 silicon bonded terminally unsaturated hydrocarbon groups having from 2 to 6 carbon atoms and any remaining silicon bonded organic groups being monovalent hydrocarbon groups of 1 to 12 carbon atoms. Such unsaturated groups include alkenyl groups such as vinyl, allyl, butenyl, and/or hexenyl, alternatively vinyl or alkynyl groups such as propynyl and/or butynyl. The remaining silicon bonded organic groups in the polyorganosiloxane may be alkyl, aryl, and/or phenyl groups. Alkyl groups are exemplified by methyl, ethyl, propyl and butyl; alternatively methyl or ethyl; and alternatively methyl. The polyorganosiloxane may be linear, branched, cyclic or resinous; alternatively linear or cyclic; alternatively resinous; and alternatively linear. The polyorganosiloxane may be, for example, a vinyl terminated polydimethylsiloxane, methyl-vinyl cyclotetrasiloxane, trimethylsiloxy-terminated (dimethylsiloxane/methylvinylsiloxane) copolymer, and/or (dimethylsiloxane/methylvinylphenylsiloxane) copolymer. Specific examples include 1,3-divinyl tetramethyldisiloxane. The polyorganosiloxane may have unsaturated groups present on adjacent silicon atoms. Resinous polyorganosiloxanes suitable for starting material C) may comprise unit formula:

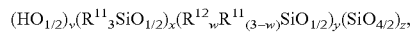

where each $R^{11}$ is independently a monovalent hydrocarbon group of 1 to 12 carbon atoms (as described above), each $R^{12}$ is independently a terminally unsaturated hydrocarbon group (as described above), subscript v≥0, subscript w is 1 to 3, subscript x≥0, subscript y>0, and subscript z>0. Alternatively, subscript x is 0 to 200, subscript y is 1 to 202, and subscript z is 1 to 100. Alternatively, each $R^{11}$ is a methyl or phenyl group and each $R^{12}$ is a vinyl group.

The resinous polyorganosiloxane may contain an average of 3 to 30 mole percent of unsaturated groups, alternatively 0.1 to 30 mole percent, alternatively 0.1 to 5 mole percent, alternatively 3 to 100 mole percent. The mole percent of unsaturated groups is the ratio of the number of moles of unsaturated group-containing siloxane units in the resinous polyorganosiloxane to the total number of moles of siloxane units in the resinous polyorganosiloxane, multiplied by 100.

Methods of preparing resinous polyorganosiloxanes are known in the art. For example, resinous polyorganosiloxane may be prepared by treating a resin copolymer produced by the silica hydrosol capping process of Daudt, et al. with at least an alkenyl-containing endblocking reagent. The method of Daudt et al., is disclosed in U.S. Pat. No. 2,676,182.

The method of Daudt, et al. involves reacting a silica hydrosol under acidic conditions with a hydrolyzable triorganosilane such as trimethylchlorosilane, a siloxane such as hexamethyldisiloxane, or mixtures thereof, and recovering a copolymer having M-units and Q-units. The resulting copolymers may contain from 2 to 5 percent by weight of hydroxyl groups.

The polyorganosiloxane may be used in an amount of at least 3.5 moles of polyorganosiloxane per mole of platinous halide, alternatively 3.5 moles to 150 moles of polyorganosiloxane per mole of platinous halide, alternatively 3.5 moles to 130 moles of polyorganosiloxane per mole of platinous halide, alternatively 3.5 moles to 20 moles of polyorganosiloxane per mole of platinous halide; alternatively 5 moles to 15 moles of polyorganosiloxane per mole of platinous halide.

E) Additional Polyorganosiloxane

Starting material E) is an additional polyorganosiloxane, other than the polyorganosiloxane selected for starting material D). The additional polyorganosiloxane may be added in an amount up to 25% based on weight of the reaction mixture formed in step 1) of the process described above. Starting material E) may be an additional amount of a polyorganosiloxane selected as starting material D). Alternatively, starting material E) may be a non-functional polyorganosiloxane, such as trimethylsiloxy-terminated polydimethylsiloxane. Alternatively, a mixture of a non-functional polyorganosiloxane and an additional amount of a polyorganosiloxane selected as starting material D) may be used as starting material E). Starting material E), when present, may be used in an amount up to 25% based on weight of all starting materials.

EXAMPLES

These examples are intended to illustrate some embodiments of the invention and should not be interpreted as limiting the scope of the invention set forth in the claims. Abbreviations used herein are defined below in Table 1.

TABLE 1

| Abbreviation | Definition |
| --- | --- |
| PCC | Pyridinium Chlorochromate available from Aldrich (oxidant) |
| DVTMDS | 1,3-divinyl-1,1,3,3-tetramethyldisiloxane |
| g | grams |
| h | hours |
| L1 | (4E)-3-4-Dimethyl-4-hexen-2-one |
| L2 | (5E)-5-Methyl-5-hepten-3-one |
| L3 | 4-Penten-2-one |
| L4 | 3-Methyl-4-penten-2-one |
| L5 | 4-Methyl-4-penten-2-one |
| L6 | 3,4-Dimethyl-4-penten-2-one |
| L7 | 3,3-Dimethyl-4-penten-2-one |
| L8 | 3,3,4-Trimethyl-4-penten-2-one |
| L9 | A mixture of 85% (4Z)-3,4-Dimethyl-4-hexen-2-one and 15% (4E)-3,4-Dimethyl-4-hexen-2-one |
| L10 | 2-(1-cyclohexenyl)cyclohexanone from Alfa Aesar; IUPAC name is 1,1'-Bi(cyclohexan)-1'-en-2-one |
| L11 | 3-Buten-2-one from Aldrich |
| L12 | (3E)-3-Penten-2-one from Aldrich |
| L13 | (3E)-3-Methyl-3-penten-2-one from Aldrich |
| L14 | 4-Methyl-3-penten-2-one from Aldrich |
| M | Molar |
| MEK | Methyl ethyl ketone |
| mL | Milliliters |
| NMR | Nuclear Magnetic Resonance |
| PtCl2 | Platinum dichloride from Heraeus |
| RT | Room temperature of 25° C. |
| THF | Tetrahydrofuran |

In Reference Example 1, Enone Additive L3, 4-Penten-2-one, was prepared as follows. To a suspension of PCC (16.2 g) in 25 mL of dichloromethane was added penten-4-ol (5.1 mL) in 5 mL of dichloromethane at room temperature. After addition, the mixture was stirred at room temperature for 3 hours, then 50 mL of diethyl ether was added. Black tar rapidly formed on the bottom of the flask. The liquid phase was separated, and the black tar was washed with diethyl ether (20 mL×3). The combined organic solution was passed through a short celite pad, then concentrated with a rotary evaporator to give the crude product, which was further purified by distillation (50° C.) under high vacuum to give L3 as clear colorless liquid (3.5 g). $^1$H NMR (CDCl$_3$, 400 MHz): 5.91 (1H, m), 5.15 (2H, m), 3.17 (2H, d, J=8 Hz), 2.15 (3H, s).

In Reference Example 2 Enone Additive L4, 3-Methyl-4-penten-2-one, was prepared as follows. In a 500 mL flask, was added CuI (1.3 g) and vinyl magnesium bromide (0.5 M in THF, 150 mL). The mixture was cooled to −10° C., then cis-2,3-dimethyloxirane (6.2 mL) in 20 mL of THF was slowly added over 20 min. After addition, the reaction was warmed up to 0° C. and stirred for 2 hours, then quenched with methanol (5 mL). THF was removed with a rotary evaporator, and the residue was extracted with diethyl ether (3 ×50 mL). The resulting combined ether solution was washed with brine, dried over Na$_2$SO$_4$, filtered and concentrated with a rotary evaporator to give the crude product as light yellow oil, which was further purified by distillation at 80° C. under vacuum to give the homoallylic alcohol as clear liquid (3.5 g). PCC oxidation was carried out by following the same procedure as L3, and the crude product was purified by distillation at 30° C. under vacuum to give a mixture of L4 and its conjugated isomer (ratio:2:1) as light yellow liquid (2.5 g).). 1H NMR of L4 (CDCl3, 400 MHz): 5.80 (1H, m), 5.15 (2H, m), 3.18 (1H, m), 2.14 (3H, s), 1.17 (3H, d, J=8.0 Hz).

In Reference Example 3 Enone Additive L5, 4-Methyl-4-penten-2-one, was prepared as follows. In a 500 mL flask, was added CuI (1.5 g) and 1-methylethenyl magnesium bromide (0.5 M in THF, 232 mL). The mixture was cooled to −10° C., then 2-methyloxirane (5.6 mL) was slowly added over 20 min. After addition, the reaction was warmed up to 0° C. and stirred for 2 hours, then quenched with methanol (5 mL). THF was removed with a rotary evaporator, the residue was extracted with diethyl ether (3×50 mL). The combined ether solution was washed with brine, dried over Na$_2$SO$_4$, filtered and concentrated with a rotary evaporator to give the crude product as light yellow oil, which was further purified by distillation at 80° C. under vacuum to give the homoallylic alcohol as clear liquid (5.4 g). 3 g of this product was used for PCC oxidation by following the same procedure as L3, and the crude product was purified by distillation at 30° C. under vacuum to give L5 as colorless liquid (2.2 g.).). $^1$H NMR (CDCl$_3$, 400 MHz): 4.94 (1H, s), 4.81 (1H, s), 3.10 (2H, s), 2.14 (3H, s), 1.73 (3H, s).

In Reference Example 4 Enone Additive L6, 3,4-Dimethyl-4-penten-2-one, was prepared as follows. In a 500 mL flask, was added CuI (0.8 g) and 1-methylethenyl magnesium bromide (0.5 M in THF, 126 mL). The mixture was cooled to −10° C., then cis-2,3-dimethyloxirane (3.7 mL) in 12 mL of THF was slowly added over 20 min. After addition, the reaction was warmed up to 0° C. and stirred for 2 hours, then quenched with methanol (5 mL). THF was removed with a rotary evaporator, the residue was extracted with diethyl ether (3×50 mL). The combined ether solution was washed with brine, dried over Na$_2$SO$_4$, filtered and concentrated with a rotary evaporator to give the crude product as light yellow oil (1.9 g), which was used for next step without further purification. PCC oxidation was carried out by following the same procedure as L3, and the crude product was purified by distillation at 30° C. under vacuum to give L6 as light yellow liquid (1.5 g). $^1$H NMR (CDCl$_3$, 400 MHz): 4.92 (1 H, s), 4.88 (1 H, s), 3.20 (1 H, q, J=8 Hz), 2.11 (3H, s), 1.66 (3H, s), 1.15 (3H, d, J=8 Hz).

In Reference Example 5 Enone Additive L7, 3,3-Dimethyl-4-penten-2-one, was prepared as follows. To a 250 mL flask, was added Zn (4.4 g), Cp2TiCl2 (67 mg) and THF (100 mL), and the mixture was stirred for 10 min. A solution of acetaldehyde (1.5 mL) and 1-bromo-3-methyl-2-butene (10 g) in THF (10 mL) was added, and the reaction was stirred at room temperature for 1 day. Then saturated aqueous NH4Cl (200 mL) and diethyl ether (200 mL) were added to the flask, and the organic layer was separated, the aqueous layer was extracted with diethyl ether (3×30 mL). The combined ether solution was washed with brine, dried over $Na_2SO_4$, filtered and concentrated with a rotary evaporator to give the crude product, which was further purified by flash chromatography on silica gel eluting with hexanes/ethyl acetate (20:1 to 10:1) to give the homoallylic alcohol as a light yellow liquid (0.85 g). PCC oxidation was carried out by following the same procedure as L3, and the crude product was purified by flash chromatography on silica gel eluting with hexanes/ethyl acetate (5:1) to give L7 as colorless liquid (0.5 g).). 1H NMR (CDCl3, 400 MHz): 5.90 (1H, dd, J=16 & 8 Hz), 5.13 (2H, dd, J=16 & 4 Hz), 2.10 (3H, s), 1.21 (6H, s).

In Reference Example 6 Enone Additive L8, 3,3,4-Trimethyl-4-penten-2-one, was prepared as follows. To the mixture of 2,3-dimethyl-2-butene (7 mL) and acetic anhydride (56 mL) at 0° C., was added $ZnCl_2$ (4.0 g) in small portions. After addition, the mixture was stirred at room temperature for 1 day, then carefully quenched with slow addition of 100 mL of saturated aqueous $Na_2CO_3$. The mixture was extracted with hexanes (3×100 mL), and the combined hexane solution was washed with brine, dried over $MgSO_4$, then filtered and concentrated with a rotary evaporator to give the crude product as red liquid. It was further purified by distillation under high vacuum at 50° C. to give L8 as light yellow liquid (3.5 g). $^1$H NMR (CDCl$_3$, 400 MHz): 4.94 (2H, s), 2.04 (3H, s), 1.64 (3H, s), 1.21 (6H, s).

In Reference Example 7 Enone Additive L9, 3,4-Dimethyl-4-hexen-2-one was prepared as follows. In a 500 mL flask, was added CuI (1.2 g) and 1-methyl-propen-1-yl magnesium bromide (0.5 M in THF, 200 mL). The mixture was cooled to −10° C., then cis-2,3-dimethyloxirane (5.8 mL) was slowly added over 20 min. After addition, the reaction was warmed up to room temperature and stirred for 2 hours, then quenched with methanol (5 mL). THF was removed with a rotary evaporator, the residue was extracted with diethyl ether (3×50 mL). The combined ether solution was washed with brine, dried over $Na_2SO_4$, filtered and concentrated with a rotary evaporator to give the crude product, which was further purified by distillation at 80° C. under vacuum to give the homoallylic alcohol as clear liquid (5.5 g). 3 g of this product was used for PCC oxidation by following the same procedure as L3, and the crude product was purified by distillation at 30° C. under vacuum to give a mixture of L1 and L9 as colorless liquid (2.2 g, L1: 15%, L9: 85%).). $^1$H NMR (CDCl$_3$, 400 MHz): L9: 5.41 (1H, m), 3.60 (1H, q, J=8 Hz), 2.05 (3H, s), 1.68 (3H, d, J=8 Hz), 1.53 (3H, s), 1.07 (3H, d, J=8 Hz).

Examples 1-11 and Comparative Examples 1 and 2 were prepared using the following general experimental procedure. A mixture containing $PtCl_2$ (1 g), MEK (5 g), DVTMDS (10 g), and an enone additive (in an amount of 50 mol % based on the amount of $PtCl_2$) was heated at 85° C. under $N_2$ for 8 hours (or until all of solid $PtCl_2$ visually disappeared, if <8 hours). The resulting was filtered, and the residue was weighed for calculation of conversions. The weight of the residue was divided by the starting weight of PtCl2, and the resulting value was subtracted from 100%. The result was recorded as Yield (%). The $^{195}$Pt NMR spectra of the filtrate was used to confirm platinum vinyl-terminated polydimethylsiloxane complex formed.

Examples 1-11 and Comparative Examples 1 and 2 were prepared using the general procedure above. The enone additive, reaction time, and yield are shown below in Table 2.

TABLE 2

| Sample | Enone Additive | Time (hours) | Yield (%) |
|---|---|---|---|
| 1 | L3 | 3 | 99.0 |
| 2 | L4 | 8 | 87.8 |
| 3 | L5 | 4.5 | 94.0 |
| 4 | L7 | 8 | 92.7 |
| 5 | L8 | 8 | 91.2 |
| 6 | L9 | 5.5 | 99.1 |
| 7 | L10 | 8 | 94.1 |
| 8 | L11 | 8 | 94.9 |
| 9 | L12 | 8 | 91.9 |
| 10 | L13 | 8 | 98.8 |
| 11 | L14 | 8 | 92.4 |
| Comparative 1 (Control) | No additive | 8 | 80-85 |
| Comparative 2 | L6 | 8 | 59.0 |

These examples show that an enone additive can decrease the reaction time and/or improve conversion to make a platinum organosiloxane complex as compared to a control sample with no additive, under the conditions tested. Without wishing to be bound by theory, it is thought that poor quality platinum dichloride can be used in the process described herein with low reaction time and/or high conversion of the starting materials to form platinum organosiloxane complex. Without wishing to be bound by theory, it is thought that L6 chelated to the PtCl2 too strongly such that it could not release the PtCl2 to complex with the vinyl terminated polydimethylsiloxane under the conditions tested.

Examples 12-14 and Comparative Examples 3 and 4 were prepared as follows using this general procedure. A 100 mL flask was assembled (no grease) with a 12" water-jacketed reflux column, a thermocouple, a turbidity probe, a magnetic stirbar and a heating mantle, blanketed with nitrogen. 0.3 g of an enone additive was mixed with 9.9 g MEK and 19.8 g DVTMDS. This 30 g solution (containing 1 wt % enone) was added to 2.0 g PtCl2 in the flask. The contents of the flask were stirred and heated to 85° C., making sure not to overshoot by more than 2° C. The contents of the flask were then refluxed with water cooling on the column. After some time (measured from when the mixture in the flask reached 84° C.), heating and insulation were removed to cool the mixture. Once the temperature was <30° C., the mixture was filtered through a pre-weighed 0.45 um membrane. The dried membrane and solids were weighed to obtain the net weight of captured solids. Yield was calculated as described above, but after different amounts of time. The results are shown below in Table 3.

Example 15 and Comparative Examples 5 and 6 were prepared as in examples 12-14 and comparative examples 3 and 4, respectively, using a different batch of PtCl2. Yield was calculated as described above, but after different amounts of time. The results are shown below in Table 3.

TABLE 3

| Sample Type | Example | Enone Additive | Time (h) | Yield |
|---|---|---|---|---|
| Control (time to completion) | Comparative Example 3 | none | 14 | 98.4% |
| Control | Comparative | none | 8 | 93.5% |

TABLE 3-continued

| Sample Type | Example | Enone Additive | Time (h) | Yield |
|---|---|---|---|---|
| Additive | Example 4 12 | L5 | 11 | 98.7% |
| Additive | 13 | L9 | 9 | 99.0% |
| Additive | 14 | L3 | 5 | 98.4% |
| Control (reached completion in 8 hours) | Comparative Example 5 | none | 8 | 99.3% |
| Half Time | Comparative Example 6 | none | 4 | 91.7% |
| Additive | 15 | L3 | 4 | 98.8% |

Examples 12 to 15 and Comparative Examples 3-6 show that adding an enone additive can improve yield with the same or shorter processing time as compared to a process with the same conditions except that the enone additive is omitted. Comparative Example 3 shows the reaction mixture took 14 hours to reach 98.4% yield, but adding 1% of enone additive L5 in example 12 shortened reaction time to 11 hours to reach 98.7% yield. Enone additives L9 and L3 provided further benefits in that even shorter reaction times achieved the same or higher yield as in Comparative Example 3, as shown in Examples 13 and 14. Example 15 shows that adding enone additive L3 improved yield in 4 hours to 98.8% as compared to only 91.7% yield achieved under the same conditions but without the enone additive in Comparative Example 6.

Industrial Applicability

With relatively low processing times as compared to previous processes, high yield of the platinum organosiloxane complex can be achieved by the process described herein. Without wishing to be bound by theory, it is thought that the present process is robust in that quality of the platinous halide selected for starting material A) is not critical to achieve the yields of the present process. The platinous halide useful as starting material A) may contain up to 10% zero valent platinum ($Pt^O$) without expectation of a detrimental effect on yield achieved with the present process. Similarly, the yield of the present process is not dependent upon particle size and/or crystallite size of the platinous halide selected for starting material A), as may have been required for previous processes.

Definitions and Usage of Terms

All amounts, ratios, and percentages are by weight unless otherwise indicated. The amounts of all ingredients in a composition total 100% by weight. The Brief Summary of the Invention and the Abstract are hereby incorporated by reference. The articles 'a', 'an', and 'the' each refer to one or more, unless otherwise indicated by the context of specification. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup alkyl and aryl; and any other individual member and subgroup subsumed therein.

"Alkyl" means an acyclic, branched or unbranched, saturated monovalent hydrocarbon group. Examples of alkyl groups include methyl, ethyl, propyl, 1-methylethyl, butyl, 1-methylpropyl, 2-methylpropyl, 1,1-dimethylethyl, 1-methylbutyl, 1-ethylpropyl, pentyl, 2-methylbutyl, 3-methylbutyl, 1,2-dimethylpropyl, 2,2-dimethylpropyl, hexyl, heptyl, 2-ethylhexyl, octyl, nonyl, and decyl; and as well as other branched saturated monovalent hydrocarbon groups with 6 or more carbon atoms. Alkyl groups have at least one carbon atom. Alternatively, alkyl groups may have 1 to 12 carbon atoms, alternatively 1 to 10 carbon atoms, alternatively 1 to 6 carbon atoms, alternatively 1 to 4 carbon atoms, alternatively 1 to 2 carbon atoms, and alternatively 1 carbon atom.

"Alkenyl" means an acyclic, branched, or unbranched monovalent hydrocarbon group, where the monovalent hydrocarbon group has a double bond. Alkenyl groups include ethenyl, allyl, propenyl, butenyl, and hexenyl. Alkenyl groups have at least 2 carbon atoms. Alternatively, alkenyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Alkynyl" means an acyclic, branched, or unbranched monovalent hydrocarbon group, where the monovalent hydrocarbon group has a triple bond. Alkynyl groups include ethynyl, propynyl, and butynyl. Alkynyl groups have at least 2 carbon atoms. Alternatively, alkynyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Aryl" means a hydrocarbon group derived from an arene by removal of a hydrogen atom from a ring carbon atom. Aryl is exemplified by, but not limited to, phenyl and naphthyl. Aryl groups have at least 5 carbon atoms. Monocyclic aryl groups may have 5 to 9 carbon atoms, alternatively 6 to 7 carbon atoms, and alternatively 6 carbon atoms. Polycyclic aryl groups may have 10 to 17 carbon atoms, alternatively 10 to 14 carbon atoms, and alternatively 12 to 14 carbon atoms.

"Carbocycle" and "carbocyclic" refer to a hydrocarbon ring. Carbocycles may be monocyclic or polycyclic, e.g., bicyclic or with more than two rings. Bicyclic carbocycles may be fused, bridged, or spiro polycyclic rings. Carbocycles have at least 3 carbon atoms. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated (e.g., cyclopentane or cyclohexane), partially unsaturated (e.g., cyclopentene or cyclohexene), or fully unsaturated (e.g., cyclopentadiene or cycloheptatriene).

"Cycloalkyl" refers to a saturated hydrocarbon group including a carbocycle. Cycloalkyl groups are exemplified by cyclobutyl, cyclopentyl, cyclohexyl, and methylcyclohexyl. Cycloalkyl groups have at least 3 carbon atoms. Monocyclic cycloalkyl groups may have 3 to 9 carbon atoms, alternatively 4 to 7 carbon atoms, and alternatively 5 to 6 carbon atoms. Polycyclic cycloalkyl groups may have 7 to 17 carbon atoms, alternatively 7 to 14 carbon atoms, and alternatively 9 to 10 carbon atoms.

The invention claimed is:

1. A process for forming a product comprising a platinum organosiloxane complex, wherein the process comprises:
 1) combining starting materials comprising
  A) a platinous halide;
  B) a ketone;
  C) an enone additive distinct from any other starting materials or rearrangement products thereof where the enone additive is a compound of formula (I) and/or formula (II), where formula (I) is

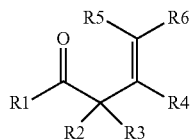

and formula (II) is

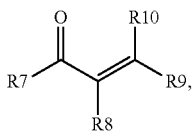

where R1 to R10 are each independently selected from hydrogen, an alkyl group having from 1 to 6 carbon atoms, or a phenyl group, or where any two of R1 to R10 may combine to form one or more carbocyclic groups; with the proviso that when R1 is methyl, one of R2 and R3 is hydrogen and the other of R2 and R3 is methyl, and R5 and R6 are both hydrogen;then R4 is not methyl; and
  D) a polyorganosiloxane having, per molecule, 2 to 4 silicon bonded terminally unsaturated hydrocarbon groups having from 2 to 6 carbon atoms and any remaining silicon bonded organic groups being monovalent hydrocarbon groups of 1 to 12 carbon atoms.

2. The process of claim 1, where the platinous halide is platinum dichloride.

3. The process of claim 1, where the ketone is methyl ethyl ketone.

4. The process of claim 3, where the enone additive is selected from the group consisting of: (C3) 4-Penten-2-one; (C4) 3-Methyl-4-penten-2-one; (C5) 4-Methyl-4-penten-2-one; (C6) 3,3-Dimethyl-4-penten-2-one; (C7) 3,3,4-Trimethyl-4-penten-2-one; (C8) (4Z)-3,4-Dimethyl-4-hexen-2-one; (C9) 2-(1-cyclohexenyl)cyclohexanone; (C10) 3-Buten-2-one; (C11) (3E)-3-Penten-2-one; (C12) (3E)-3-Methyl-3-penten-2-one; (C13) 4-Methyl-3-penten-2-one; and two or more of C3), (C4), (C5), (C6), (C7), (C8), (C9), (C10), (C11), (C12), and (C13).

5. The process of claim 1, where the enone additive is selected from the group consisting of: (C1) (4E)-3,4-Dimethyl-4-hexen-2-one; (C2) (5E)-5-Methyl-5-hepten-3-one; (C3) 4-Penten-2-one; (C4) 3-Methyl-4-penten-2-one; (C5) 4-Methyl-4-penten-2-one; (C6) 3,3-Dimethyl-4-penten-2-one; (C7) 3,3,4-Trimethyl-4-penten-2-one; (C8) (4Z)-3,4-Dimethyl-4-hexen-2-one; (C9) 2-(1-cyclohexenyl)cyclohexanone; (C10) 3-Buten-2-one; (C11) (3E)-3-Penten-2-one; (C12) (3E)-3-Methyl-3-penten-2-one; (C13) 4-Methyl-3-penten-2-one; and two or more of (C1), (C2), (C3), (C4), (C5), (C6), (C7), (C8), (C9), (C10), (C11), (C12), and (C13).

6. The process of claim 1, where the polyorganosiloxane is a vinyl terminated polydimethylsiloxane.

7. The process of claim 1, where the starting materials are combined by mixing at 25° C. to 90° C. in step 1).

8. The process of claim 1, where starting materials B), C) and D) are combined to form a mixture, and thereafter the mixture and starting material A) are combined.

9. The process of claim 1, further comprising milling the platinous halide in the presence of the ketone before and/or during step 1).

10. The process of claim 1, further comprising milling the platinous halide in the presence of the ketone and/or the enone additive before and/or during step 1).

11. The process of claim 1, where step 1) is performed by heating for at least 8 hours at a temperature of 30° C. or less.

12. The process of claim 1, where step 1) is performed by heating for 1 to 8 hours at a temperature of 55° C. to 90° C.

13. The process of claim 1, further comprising step 2) neutralizing the product formed by step 1).

14. The process of claim 1, further comprising 3) recovering the platinum organosiloxane complex.

\* \* \* \* \*